Sept. 13, 1955
K. G. FRANCIS ET AL
2,717,424
PROCESS FOR PRODUCING THIN WALLED TUBES
FROM NORMALLY CRYSTALLINE POLYMERS
Filed March 1, 1954
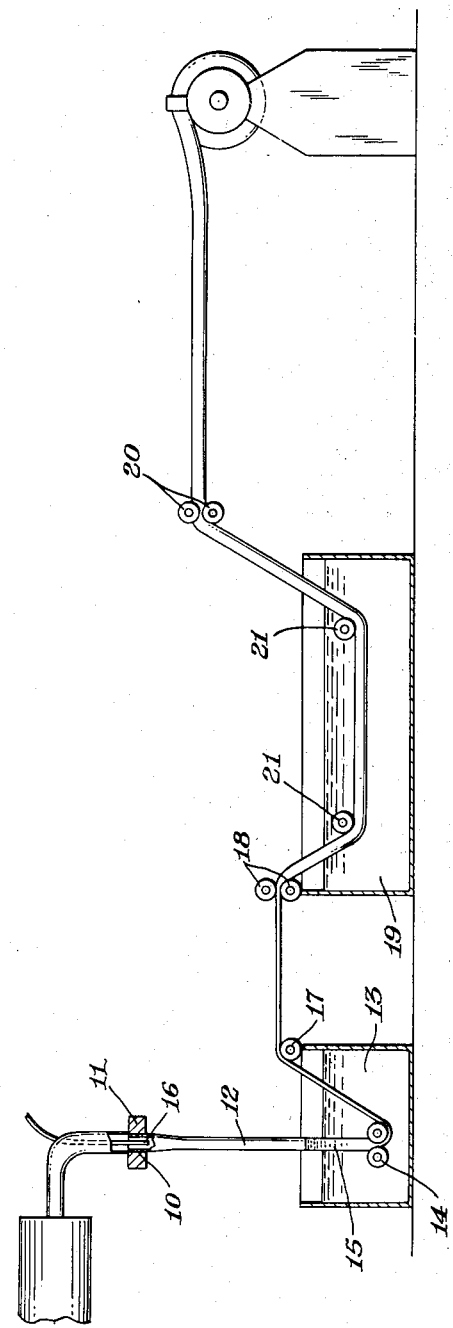
INVENTORS.
Kenneth G. Francis
John W. McIntire
BY
Griswold & Burdick
ATTORNEYS.

United States Patent Office 2,717,424
Patented Sept. 13, 1955

2,717,424

PROCESS FOR PRODUCING THIN WALLED TUBES FROM NORMALLY CRYSTALLINE POLYMERS

Kenneth G. Francis, Bay City, and John W. McIntire, Midland, Mich., assignors to The Dow Chemical Company, Midland, Mich., a corporation of Delaware Application March 1, 1954, Serial No. 413,392

4 Claims. (Cl. 18—47.5)

This invention relates to an improved process for making thin walled resilient tubes from normally crystalline vinylidene chloride polymers. For purposes of this application, the term resilient tubes will mean tubes which normally remain open, but may be collapsed under moderate pressure, and when the pressure is released will return to their normal opened configuration.

Normally crystalline vinylidene chloride polymers may be fabricated into cylindrical shapes having walls of almost any desired thickness. Pliable film having a thickness in the range of from 0.0005 to 0.002 inch may be prepared from extruded tubes. Typical of the processes by which that film may be prepared is the one described in U. S. Patent 2,452,080. In the method of that patent vinylidene chloride polymer is extruded in tubular form downwardly into a bath of cold water to supercool it. The tube may be warmed slightly and then cold stretched to 3 or more times its original diameter by inflating a portion of the tube between two separate pairs of pinch rolls. That method is very useful when sheets of bilaterally oriented and relatively thin film are desired. However, it is not suitable when unoriented, resilient tubing of a uniform gauge is wanted.

Tubing with relatively thick walls of 1/16 inch or greater has also been prepared by extruding vinylidene chloride polymers through a ring die orifice. Such tubing is subjected to no stretching at any time in its manufacture. After the tubing has cooled, it may be bent around a large radius but not a small radius, and is therefore not suitable for forming ampoules from which a product is ejected by pinching the walls together.

When making resilient ampoules, such as those used in dispensing certain pharmaceuticals, cosmetics, and the like, from extruded tubes, it is necessary to provide tubes whose walls are within the range of 0.005 to 0.01 inch, are of uniform gauge, and are unoriented. The use of air provides a rate of crystallization that is much too slow for practical production of tubing when the walls of the tubing are not stretched by expansion at the same time. Air regulators are not available which will maintain air pressure sufficiently constant to produce tubing with the desired thin unoriented walls without rupturing them. A still further disadvantage lies in the buoyancy given an air filled tube when immersed in a water bath. Any movement of the water in the bath distorts the tube varying the shape, size, or wall thickness of the tube.

It is accordingly an object of this invention to provide a process by which resilient tubes of uniform wall thickness from normally crystalline vinylidene chloride polymers can be prepared.

To accomplish the objects of the invention, a tube of fused normally crystalline vinylidene chloride polymer is extruded downwardly into a cooling bath wherein it is supercooled. The tube is filled with a quantity of an inert liquid, such as mineral oil, to maintain the diameter of the tube and the wall thickness constant and to prevent any distortion of the tube due to the movement of water in the water bath. The freshly extruded tube is withdrawn from the die orifice by a pair of pinch rolls immersed in the water bath at a faster rate than it is being extruded, so that a necking down of the tube occurs. The difference in rate that is required is dependent upon the difference between the diameter and wall thickness of the tube as it leaves the die orifice and the diameter and wall thickness of the desired resilient tube. The final diameter and wall thickness of the tube are determmined at this point, and are not altered by any of the further operations of the process. The supercooled tube is then passed through two separate pairs of pinch rolls between which the tube is immersed in a hot water bath. The tube between these two pairs of rolls is filled with hot water during its passage through the second water bath to provide faster and more uniform crystallization, to prevent any collapse of the tube, and to prevent any distortion of the tube due to the movement of the water in the water bath.

The temperature of the first bath is kept at a temperature which will supercool the tube. When normally crystalline vinylidene chloride copolymers are used, this temperature will be about 40° C. or lower. The level of this first bath should be far enough from the die orifice so that the stretching process is substantially complete before the tube enters the bath or, in other words, before the tube has been supercooled. Thus, all of the stretching is done on a hot plastic mass and does not appreciably orient the plastic. The tube is filled with an inert liquid for the reasons previously mentioned. The inert liquid extends within the tube from the pinch rolls within the supercooling bath back towards the die orifice but terminating at a point short of that orifice.

The second bath should be kept at a temperature that will provide the fastest practical crystallization rates. When vinylidene chloride copolymers are used, this will be at least 60° C. and preferably near 90° C. The water inside the tube during its passage through the second bath should initially be between 85° to 90° C., although the final temperature will be in equilibrium with the water in the second bath.

Although tubing with any diameter may be prepared in accordance with the process of this invention, it will generally be limited to tubing 1 inch in diameter or less for practical considerations. For example, with tubing of large diameters correspondingly larger dies will be required and control of the extrusion process will be made more difficult.

In carrying out the process of the invention, a fused, normally crystalline, vinylidene chloride polymer is extruded through a ring die orifice 10 in a die head 11 to form a soft plastic tube 12. The die head 11 is positioned to extrude the tube 12 downwardly into a cooling bath 13 maintained at a temperature within the range wherein the extruded tube 12 is quickly chilled and supercooled without substantial crystallization. Immersed within the water bath 13 is a pair of driven pinch rolls 14 by which the extruded tube 12 is drawn from the orifice 10. The pinch rolls 14 are operated at a peripheral speed greater than the linear rate at which the tube 12 is being extruded. The tube 12 is thus necked down to a smaller diameter than the diameter of the ring die orifice 10, and the wall thickness of the tube 12 is reduced to that which is desired. It is desirable that the stretching be substantially complete before the tube 12 enters the super-cooling bath 13, so that the stretching will be on a fused plastic mass and the unoriented condition in the walls of the tube 12 will not be appreciably distorted. As is well known in the art, when a supercooled tube of a normally crystalline vinylidene chloride polymer is subjected to stretching conditions, the crystallites will be oriented in the direction of the stretch. The latter condition cannot exist in this invention if resilient tubes are to be produced.

As the tube 12 is drawn through the cooling bath 13 an inert liquid 15 which is suitably a mineral oil or other lubricant which will prevent the walls of the tube 12 from sticking together when the tube 12 is pressed flat, is fed through a duct 16 in the die head 11 into the newly formed tube 12, and maintained therein at a substantially constant positive head, (i. e. the level of the inert liquid 15 is above the level of the bath 13). A positive head prevents distortion of the tube 12 during supercooling.

The diameter and wall thickness of the supercooled tube 12 are determined by the dimensions of the die orifice 10 and peripheral speed of the rolls 14. It is preferred to operate with a die orifice 10 which will extrude a tube 12 having a diameter which approximates the diameter desired and a wall somewhat thicker than desired and to adjust the wall thickness by varying the peripheral speed of the rolls 14.

The supercooled tube 12 of the desired diameter is elevated from the immersed rolls 14 over a roll 17 positioned above the water bath 13 from where it is again led through a second pair of pinch rolls 18 before it enters the second hot water bath 19. The second water bath 19 accelerates the crystallization of the previously supercooled tube 12 thereby setting the dimensions and geometric configuration of the unoriented tube.

The tube is filled with hot water from the second pair of pinch rolls 18, through the second bath 19, up to a third pair of pinch rolls 20. The hot water is introduced into the tube in the initial stages of operation, when the tube is first led through the apparatus, and thereafter the water will remain confined within that portion of the tube between pinch rolls (18, 20) for as long as the process is in operation. Preferably, guide rolls 21 may be provided within the bath to maintain the tube 12 under water. By having the tube filled with hot water as it passes through the hot water bath 19 faster rates of crystallization are realized because crystallization may proceed through the walls from both the inside and outside of the tube.

The tube, after leaving the pinch rolls, may be collected on any suitable device such as on a wind-up drum.

Tubes prepared in accordance with this invention have highly resilient walls, so that when pinched closed, they will recover their original shape immediately after the pressure has been released.

In a typical example, tubes were prepared by the method of this invention from a copolymer consisting of 85 per cent vinylidene chloride and 15 per cent vinyl chloride. The tubes were ¼ inch O. D. and had wall thicknesses of 0.005 inch. Capsules were prepared by cutting the tubing into short lengths and sealing one end. The capsules were filled with a liquid shaving lotion. A cap having a small orifice was sealed to the open end of the capsule. The capsule could then be repeatedly squeezed, releasing a small portion of the lotion each time. After each release of pressure, the walls of the capsule returned to their original shape.

We claim:

1. In a process for making resilient tubing from a normally crystalline vinylidene chloride polymer, in which the polymer is fused, extruded in tubular form and with a wall thickness of at least 0.005 inch downward through air into a supercooling bath, and the supercooled tube is taken away from the supercooling bath at such a rate as to avoid any material stretching of the supercooled tube, the improvement which consists in passing the tube between pinch rolls in the supercooling bath, maintaining a column of inert liquid within the tube extending from the said pinch rolls back toward the point of extrusion but terminating short of that point, submerging the supercooled tube in and leading it through an inert liquid bath maintained at a temperature above 60° C. but below the softening point of the polymer, maintaining that portion of the tube which is immersed in said hot liquid filled with more of the inert liquid, and withdrawing the tube from the hot bath at essentially the same linear rate as it is supplied thereto.

2. The improvement claimed in claim 1, wherein the inert liquid column above said pinch rolls comprises a lubricant to prevent cohesion between internal wall surfaces when the tube is collapsed.

3. The improvement claimed in claim 1, wherein the heated liquid is at a temperature from 60° to 90° C.

4. The improvement claimed in claim 3, wherein the said heated liquid is water.

References Cited in the file of this patent

UNITED STATES PATENTS

| | | |
|---|---|---|
| 2,329,571 | Wiley | Sept. 14, 1943 |
| 2,448,433 | Irons et al. | Aug. 13, 1948 |
| 2,452,080 | Stephenson | Oct. 26, 1948 |

OTHER REFERENCES

"Processing polyvinylidene chloride," Modern Plastics, September 1947, pages 97, 98.